United States Patent [19]

Belknap et al.

[11] Patent Number: 5,710,416
[45] Date of Patent: Jan. 20, 1998

[54] PRICE VERIFIER

[75] Inventors: William M. Belknap, Lawrenceville; Thai-Bao H. Kien, Norcross, both of Ga.; Kevin P. Kellar, Burlington, Mass.

[73] Assignee: NCR Corporation, Dayton, Ohio

[21] Appl. No.: 539,454

[22] Filed: Oct. 5, 1995

[51] Int. Cl.$^6$ .............................. G06K 5/00; G06K 15/00
[52] U.S. Cl. ................................................ 235/383; 235/380
[58] Field of Search ............................... 235/383, 472, 235/432, 375; 364/405, 404, 401

[56] References Cited

U.S. PATENT DOCUMENTS

| | | | |
|---|---|---|---|
| 4,418,277 | 11/1983 | Tremmel et al. | 235/472 |
| 4,500,880 | 2/1985 | Gomersall et al. | 340/825.35 |
| 4,868,375 | 9/1989 | Blanford | 235/462 |
| 4,971,410 | 11/1990 | Wike, Jr. et al. | 350/6.5 |
| 5,172,314 | 12/1992 | Poland et al. | 364/401 |
| 5,198,644 | 3/1993 | Pfeiffer et al. | 235/383 |
| 5,256,865 | 10/1993 | Wike, Jr. et al. | 235/462 |
| 5,310,997 | 5/1994 | Roach et al. | 235/375 |
| 5,324,925 | 6/1994 | Koenck et al. | 235/472 |
| 5,335,170 | 8/1994 | Petteruti et al. | 364/403 |
| 5,345,071 | 9/1994 | Dumont | 235/383 |
| 5,349,678 | 9/1994 | Morris et al. | 395/800 |
| 5,382,779 | 1/1995 | Gupta | 235/383 |
| 5,424,521 | 6/1995 | Wolfe, Jr. et al. | 235/323 |
| 5,448,046 | 9/1995 | Swartz | 235/383 |
| 5,493,107 | 2/1996 | Gupta et al. | 235/383 |

FOREIGN PATENT DOCUMENTS

| | | | |
|---|---|---|---|
| 0170271 | 2/1986 | European Pat. Off. | 235/383 |
| 0199252 | 10/1986 | European Pat. Off. | 235/383 |
| 2449938 | 10/1980 | France | 235/383 |

*Primary Examiner*—Donald T. Hajec
*Assistant Examiner*—Thien Minh Le
*Attorney, Agent, or Firm*—Paul W. Martin

[57] ABSTRACT

A price verifier which is smaller in size than existing price verifiers and which includes additional features which provide enhanced functionality and ease of use. The price verifier includes a bar code reader for reading a bar code label on an item whose price is to be verified. Control circuitry obtains the price of the scanned item from a host terminal. A display displays the price of the item. The price verifier supports multiple communications protocols, including wireless RF. Additionally, the price verifier may be programmed by reading programming bar code labels or by downloading program commands from the host terminal.

25 Claims, 8 Drawing Sheets

PRICE VERIFIER

CROSS REFERENCE TO RELATED APPLICATIONS

The present invention is related to commonly assigned and co-pending U.S. application entitled "Compact Bar Code Scanner", invented by Collins et al., and having a U.S. Ser. No. of 08/084,779.

The present invention is related to the following commonly assigned U.S. Patents:

"Automatic Sensing and Programming Circuit and Programming Method for Optical Scanners", invented by Wike et al., and having a U.S. Pat. No. of 5,256,865;

"Scanning and Collection System for a Compact Laser", invented by Wike et al., and having a U.S. Pat. No. of 4,971,410; and "Method for Changing the Functions of a Bar Code Reader", invented by Blanford, and having a U.S. Pat. No. of 4,868,375.

The above issued patents are hereby incorporated by reference.

BACKGROUND OF THE INVENTION

The present invention relates to optical scanning devices and more specifically to a price verifier.

Optical scanners are well known for their usefulness in retail checkout and inventory control. They may be mounted within checkout counters, free-standing, or hand-held.

Some optical scanners have been employed as customer-operated price verifiers. Known price verifiers are bulky and simple in design. They include an optical scanner and a display for displaying price and item information for a scanned item.

Therefore, it would be desirable to provide a price verifier which is smaller in size than existing price verifiers and which includes additional features which add enhanced functionality and ease of use.

SUMMARY OF THE INVENTION

In accordance with the teachings of the present invention, a price verifier is provided.

The price verifier includes a bar code reader for reading a bar code label on an item whose price is to be verified. Control circuitry obtains the price of the scanned item from a host terminal. A display displays the price of the item.

The price verifier supports multiple communications protocols, including serial protocols such as EIA-232 and RS-485, and network protocols such as Ethernet and wireless RF.

Additionally, the price verifier may be programmed by reading programming bar code labels or by downloading program commands from the host terminal.

The price verifier supplements these features with the capability of activating the bar code reader upon sensing the approach of a user, displaying item locations and advertisements, printing coupons with an optional printer, and reading frequent shopper cards that entitle customers to discounts and coupons when equipped with an optional card reader.

It is accordingly an object of the present invention to provide a price verifier.

It is another object of the present invention to provide a price verifier which is smaller than existing designs.

It is another object of the present invention to provide a price verifier which includes features which enhance operation of the price verifier, such as a change in ambient light sensor or automatic object sensing, multiple communication interfaces, support for additional peripherals, and simple programmability either by reading programming bar code labels or by sending program commands from the host terminal.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
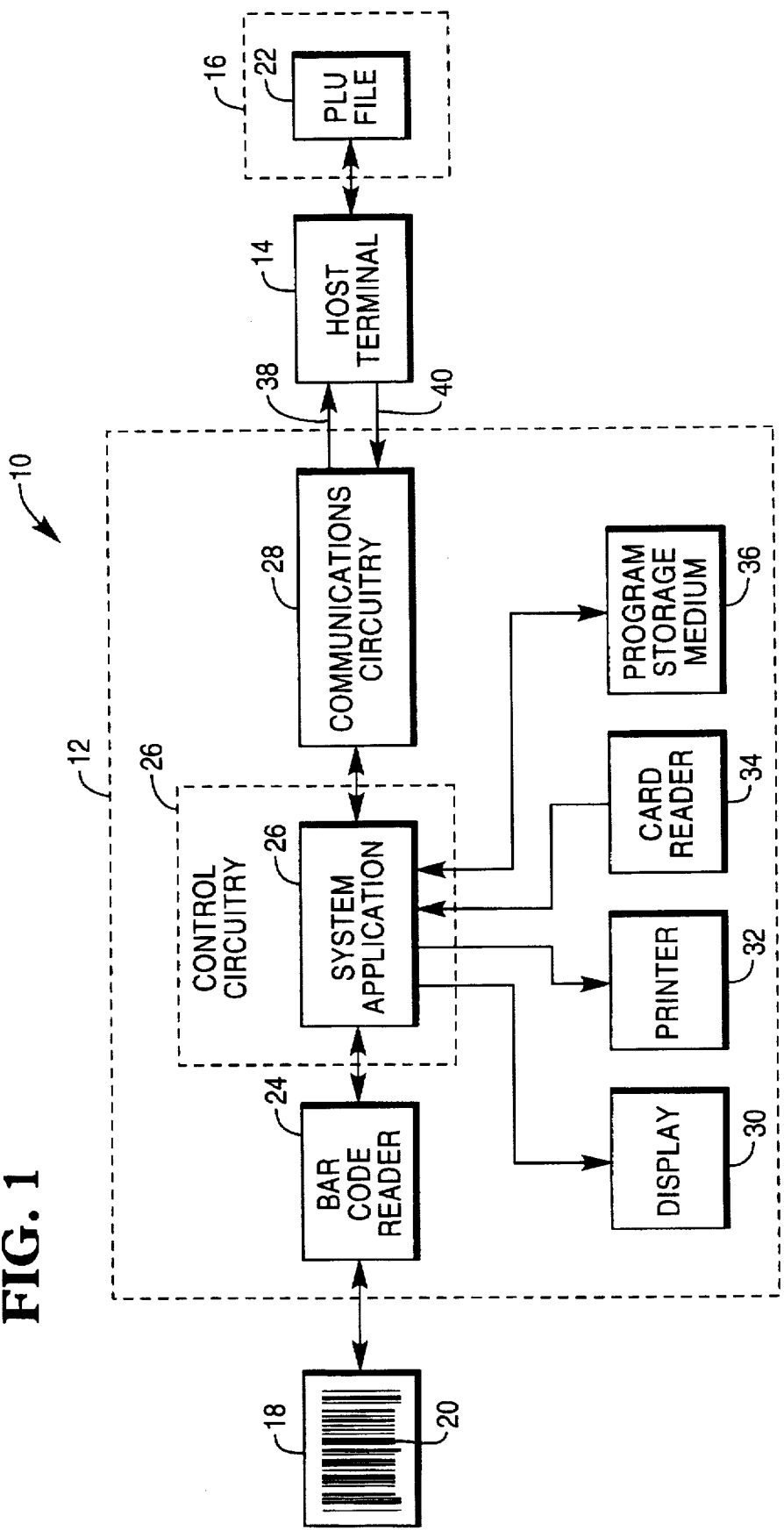
FIG. 1 is a block diagram of a system incorporating the price verifier of the present invention.

Referring now to FIG. 1, system 10 includes price verifier 12, host terminal 14, and storage medium 16.

Price verifier 12 provides a convenient way for a customer to determine the price of an item, especially for items for which there is no shelf tag or other indication of price and for items that should be on sale. This capability is required by some states. Price verifier 12 scans item 18 having bar code label 20, decodes bar code label 20, transmits the decoded bar code label data 38 to host terminal 14, receives item price and item description information 40 from host terminal 14, and displays item price and item description information 40. Item description information may include a textual description of the item and an internal inventory number.

Price verifier 12 may also be used to display advertisements and item location information to assist customers.

To assist retailers, price verifier 12 may display additional product information to which only the store employees are privy to, such as a schedule for each item showing when the item is to be placed on sale, and item inventory information. To obtain this additional information, an employee could scan a special programming bar code label, as described in the incorporated U.S. Pat. Nos. 4,868,375 and 5,256,865, to place a system application 27 in a special mode of operation. In addition, hardware configuration settings of price verifier 12 may be changed using programming bar code labels.

Price verifier 12 primarily includes bar code reader 24, control circuitry 26, communications circuitry 28, and display 30.

Bar code reader 24 preferably includes the components disclosed in commonly assigned U.S. Pat. Nos. 4,971,410 and 5,256,865, which have been incorporated by reference.

Control circuitry 26 controls operation of price verifier 12 and executes system application 27.

Communications circuitry 28 provides a communication interface between price verifier 12 and host terminal 14. Communications circuitry 28 provides support for serial protocols including EIA-232 and RS-485, and network protocols including Ethernet and wireless RF.

Display 30 is preferably a vacuum fluorescent display, liquid crystal display or other type of display. Display 30 displays item price and description information 38, and may also be used to display advertisements and item location information to assist customers.

Price verifier 12 also may include printer 32, card reader 34, and program storage medium 36.

Printer 32 preferably is a thermal printer which prints coupons for customers.

Card reader 34 is preferably a magnetic stripe reader for reading frequent shopper cards that entitle customers to discounts and coupons. Some freqeunt shopper cards include bar codes and are readable by price verifier 12.

Program storage medium 36 stores basic commands and data which control circuitry 26 reads when power is initially applied to price verifier 12, or when control circuitry 26 receives a command to restart. The basic commands and data within program storage medium 36 may be changed by reprogramming price verifier 12, either using programming bar code labels or by sending programming commands from host terminal 14. Program storage medium 36 is preferably a non-volatile memory, such as an EEPROM or EEFLASH.

Storage medium 16 stores price look-up (PLU) file 22 from which host terminal 14 obtains item price and description information 38 for display by price verifier 12.

Figure 2:
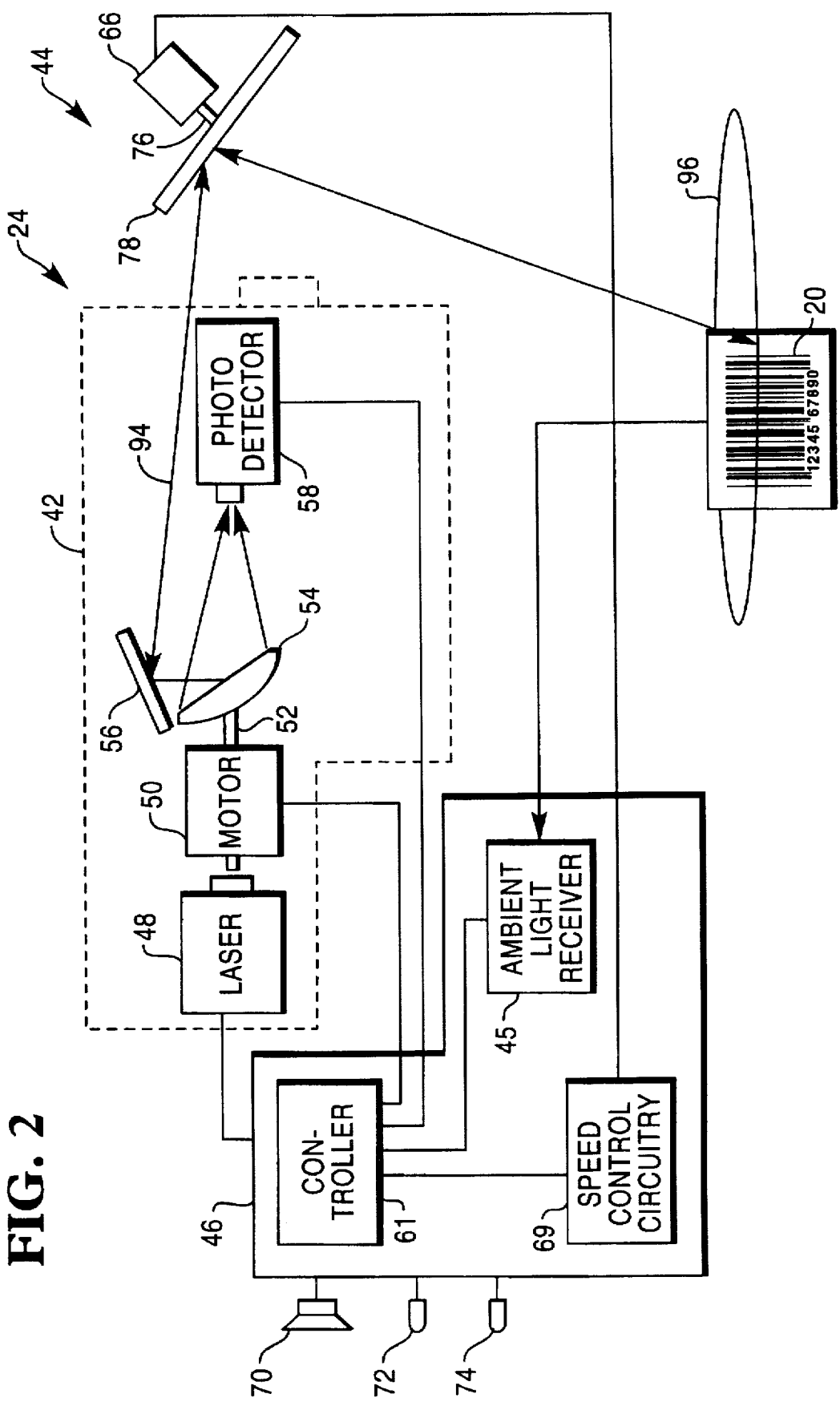
FIG. 2 is a detailed schematic representation of a bar code reader within the price verifier.
Figure 5:
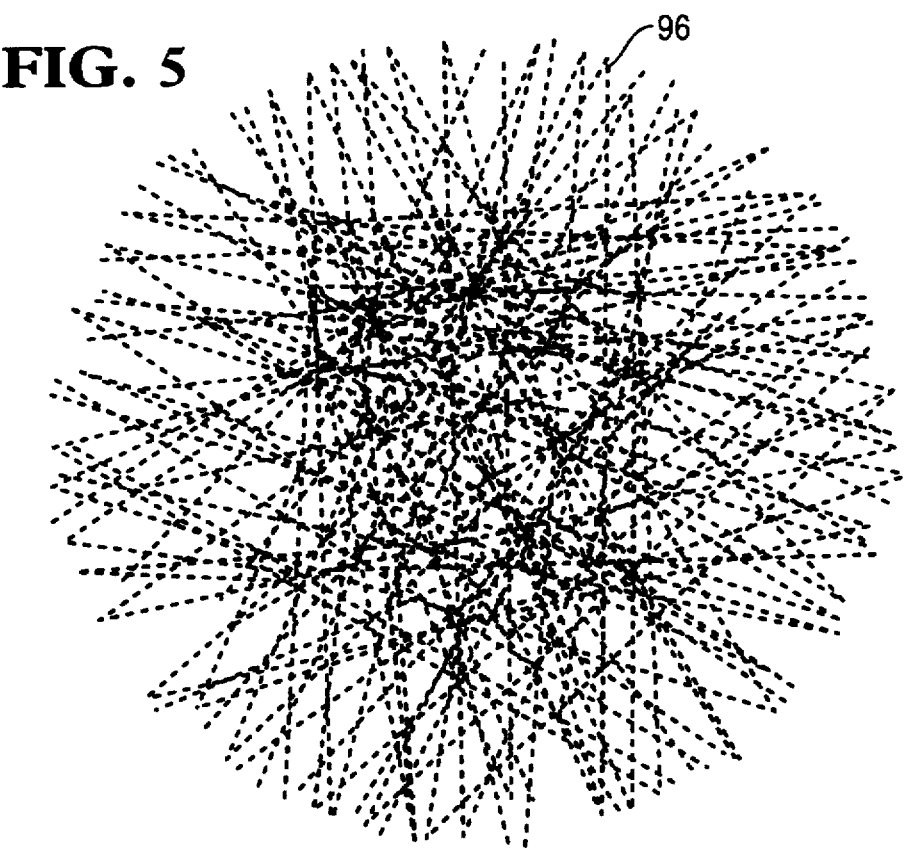
FIG. 5 is a planar view of the operational scan pattern produced by the bar code reader.

Referring now to FIG. 2, bar code reader 24 generates a substantially omnidirectional pattern and includes scan module 42, tilted mirror assembly 44, ambient light detector 45, and printed circuit board (PCB) 46. Scan module 42 produces a first scan pattern 94 (also in FIG. 5) and includes laser 48, motor 50 for driving a hollow shaft 52, optical transceiver 54 mounted to the end of shaft 52, pattern generating mirrors 56, and photodetector 58. Laser 48 projects a laser beam through hollow drive shaft 52 to be deflected by transceiver 54 towards pattern generating mirrors 56. Mirrors 56 deflect first pattern 94 towards tilted mirror assembly 44 to produce a second scan pattern 96 (also in FIG. 6), which is substantially omnidirectional and highly dense. Light reflected from bar code label 20 is redirected towards pattern generating mirrors 56. Pattern generating mirrors 56 direct the light at transceiver 54 which directs the light to photodetector 58.

PCB 46 contains processing circuitry, including a controller 61, for decoding signals generated by photodetector 58 and transmitting the decoded signals to control circuitry 26. Motor 66 is coupled to speed control circuitry 69. Printed circuit board 46 additionally contains circuitry for operating speaker 70, and green and red indicator lights 72 and 74, which represent valid and invalid reading operations, respectively.

Ambient light receiver 45 works in conjunction with controller 61 to sense the presence of a person or an item having bar code label 20 in front of bar code reader 24.

Tilted mirror assembly 44 includes motor 66 having drive shaft 76 and rotating reflecting mirror 78, which is offset-mounted to drive shaft 76. Preferably, motor 66 and motor 50 rotate in opposite directions. Motor shaft 76 is oriented at an angle to drive shaft 52, which preferably is forty-five degrees. In the preferred embodiment, bar code label 20 may also be a programming tag for programming the speed of motor 66. A feature of bar code reader 24 is that the speed ratio of motor 50 to motor 66 is selectable.

Figure 3:
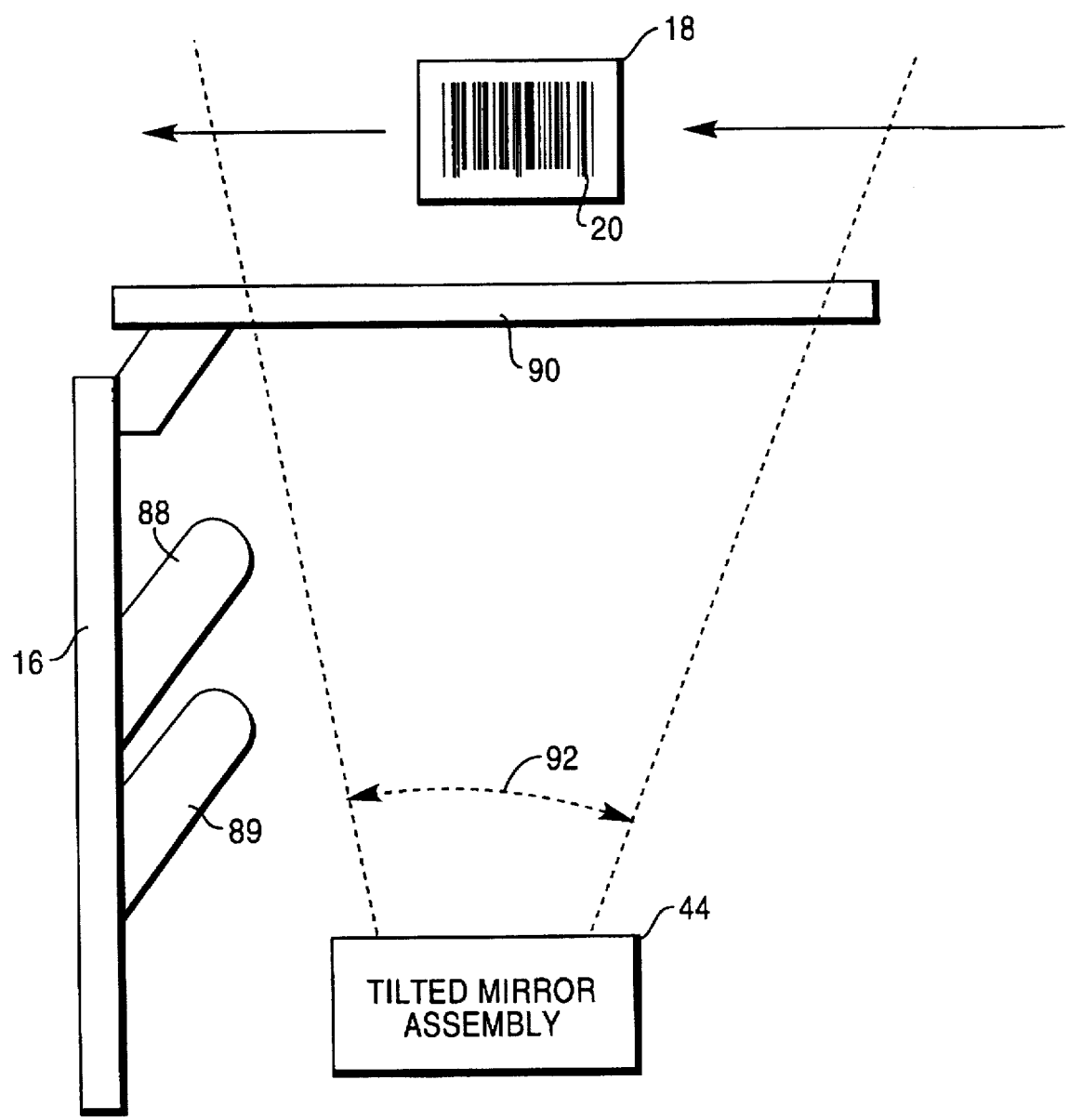
FIG. 3 is a side view of the volumes illuminated by the bar code reader and its automatic sensing circuit.
Figure 4:
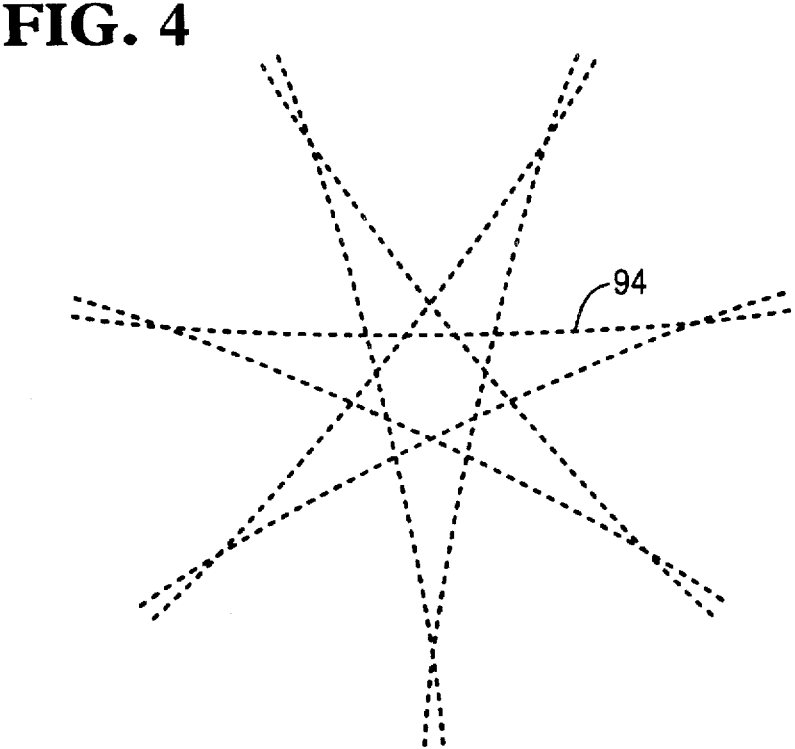
FIG. 4 is a planar view of a first scan pattern produced within the bar code reader.

Turning now to FIG. 3, ambient light detector 45 includes two photodetector diodes 88 and 89 mounted in the front bezel with electronic circuitry on printed circuit board 16. Thus, scan module 42 is activated as a person approaches the verifier and comes within a few feet thereof, thereby ensuring the unit is operational when an item is presented at the scan window 90. Detector diodes 88 and 89 are mounted in a position to receive the ambient visible light.

Figure 6:
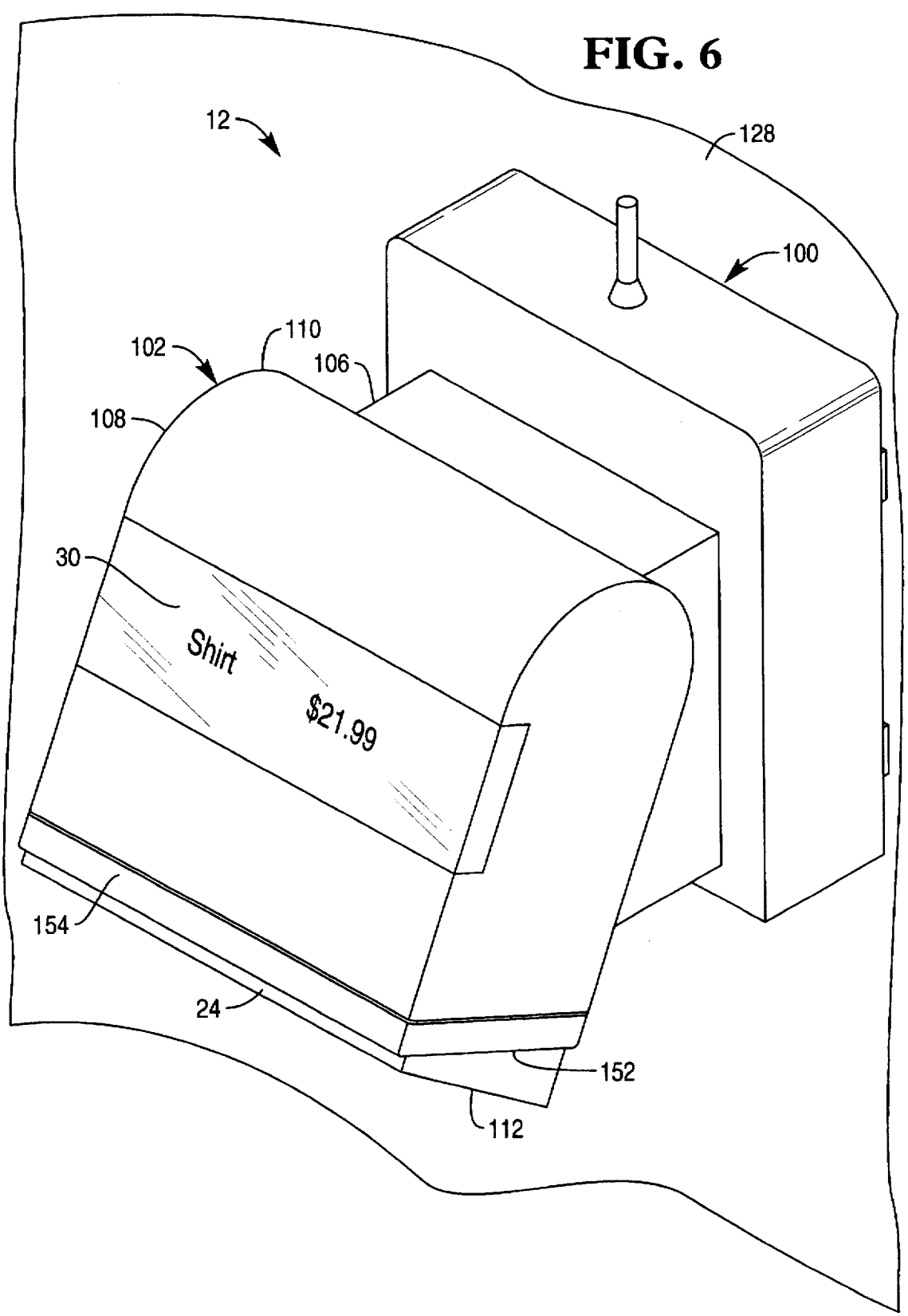
FIG. 6 is a perspective view of the price verifier.

Turning now to FIG. 6, price verifier 12 is shown in more detail. Price verifier 12 is assembled as a wall-mounted portion 100 and as a snap-on portion 102.

Portion 102 includes a generally rectangular base portion 106, which abuts portion 100, and a scanner and display portion 108, which is also generally rectangular in shape, but has a curved rear surface 110. Portion 108 contains bar code reader 24 and display 30, and is oriented at a downward angle to base portion 106 for easy customer viewing of display 30 on surface 152 and easy scanning through window 112 on surface 154, which is generally perpendicular to surface 152.

Figure 7:
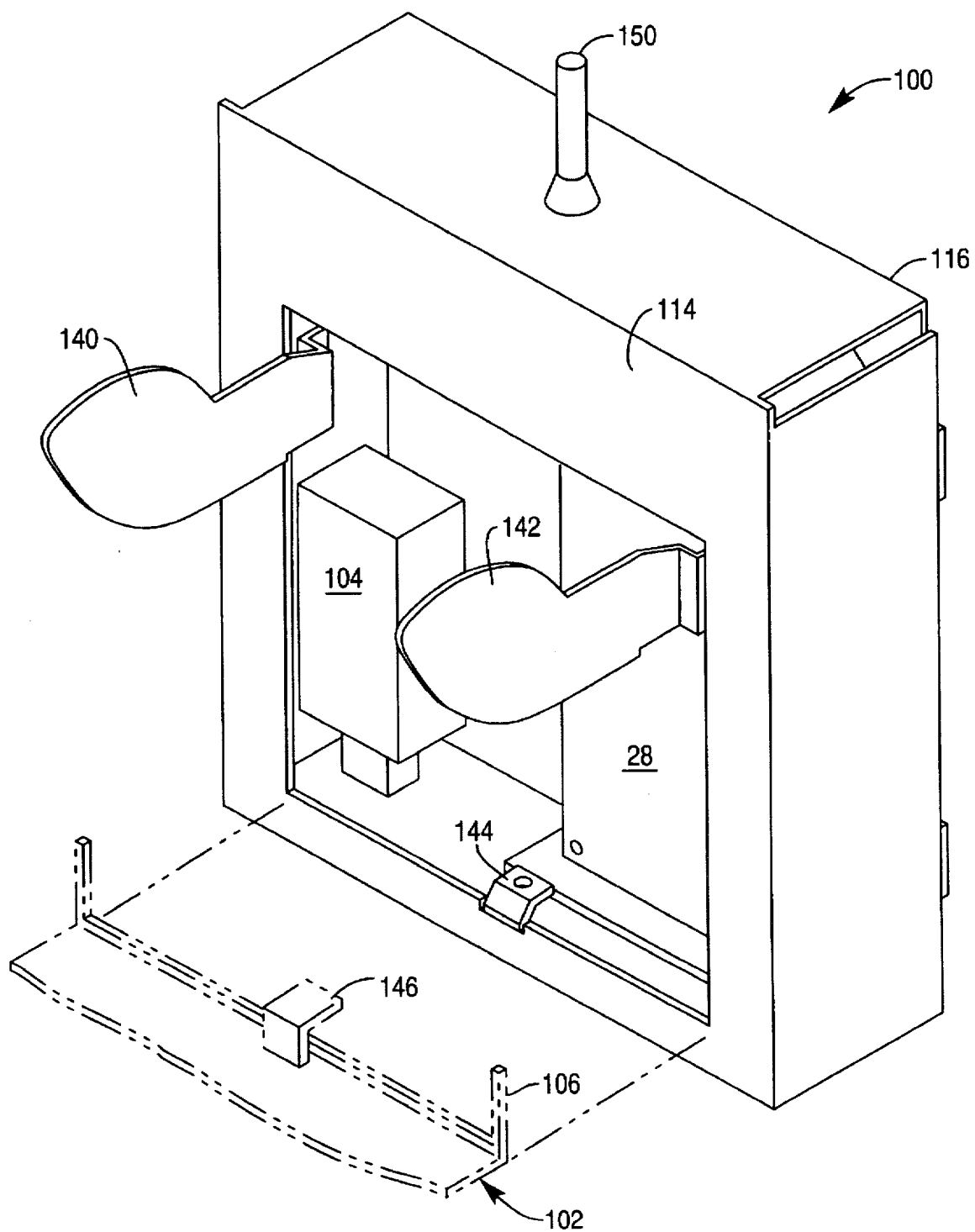
FIG. 7 is a front perspective view of a wall mounted portion of the price verifier.
Figure 8:
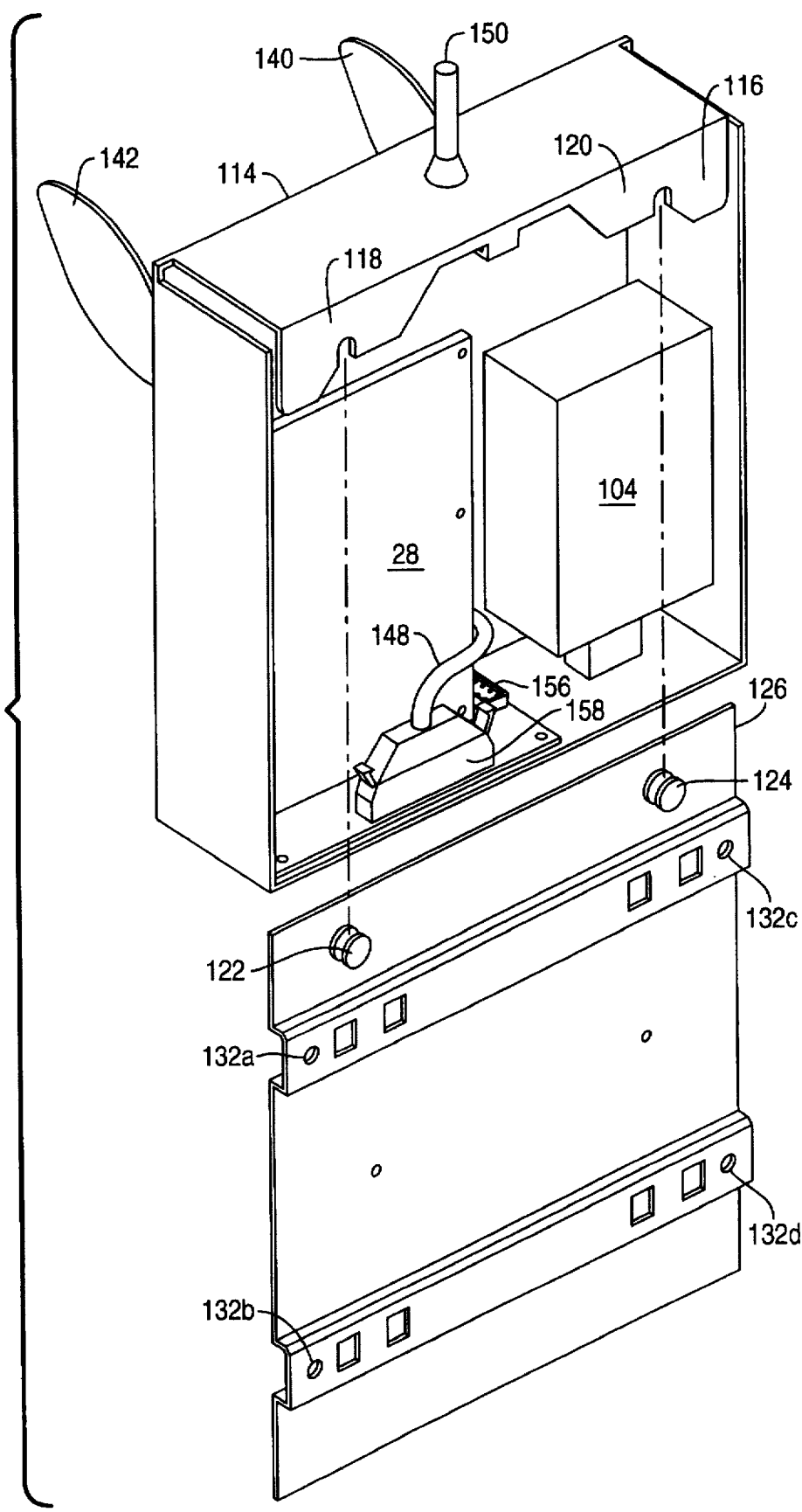
FIG. 8 is an explode view of the wall mounted portion showing a mounting bracket.

Turning now to FIGS. 7 and 8, wall-mounted portion 100 is shown in more detail. Portion 100 is generally box-like in shape and has front and rear surfaces 114 and 116. Rear surface 116 includes two mounting flanges 118 and 120 which rest upon studs 122 and 124 on mounting bracket 126 when portion 100 is installed.

Mounting bracket 126 fastens to a wall 128 (FIG. 6) or other mounting surface using screws or other fasteners through apertures 132–136.

Front surface 114 contains aperture 138 and mounting arms 140 and 142, which are inserted within generally rectangular base portion 106 of snap-on portion 102. Mounting arms 140 and 142 have a shape corresponding to surface 110 and portion 106. Portion 106 includes a latch 146 which contacts retainer 144 to secure portion 102 to portion 100. Portion 102 is installed by first inserting mounting arms 140 and 142 into portion 106, and then pivoting portion 102 downwards so that latch 146 engages retainer 144.

Portion 100 includes communications circuitry 28 and power control circuitry 104. Communications circuitry 28 is coupled to control circuitry 26 within portion 102 through a cable 148.

Communications circuitry 28 is shown here as implementing a wireless network protocol and includes antenna 150. This makes price verifier quicker and easier to install than for wire-based protocol connections, although these protocols are also available to provide retailers with a variety of installation choices. Host terminal 14 is configured in a similar fashion.

Turning now to 9, a method of programming price verifier 12 using commands communicated by host terminal 14 begins with START 160.

In step 162, host terminal 14 signals control circuitry 26 to place bar code reader 24 in a disabled mode.

In step 164, host terminal 14 sends a message to price verifier 12 which contains a code portion and a data portion. The code portion contains a function code indicating the data in the message contains programming information. The data portion of the message contains the same programming sequence that would be contained within a sequence of programming bar code labels read by bar code reader 24. Use of the same programming sequence significantly simplifies the coding requirements for both methods of programming.

In step 166, control circuitry 26 determines whether an error exists in the data portion.

If there is an error, control circuitry 26 returns a "message bad" response to host terminal 14 in step 168 and the method returns to step 164 until no errors are received.

If there are no errors, control circuitry 26 determines whether there is an "S" command (Save & Reset) at the end of the message in step 170. If there is not an "S" command, control circuitry 26 sends a "message good" response to host terminal 14 in step 172 and the method proceeds to step 174. If there is an "S" command, the method proceeds directly to step 174.

In step 174, control circuitry 26 saves the data portion in EEPROM 25.

In step 176, control circuitry 26 executes commands for restarting price verifier 12, as if from power up.

The method ends in step 178.

Figure 9:
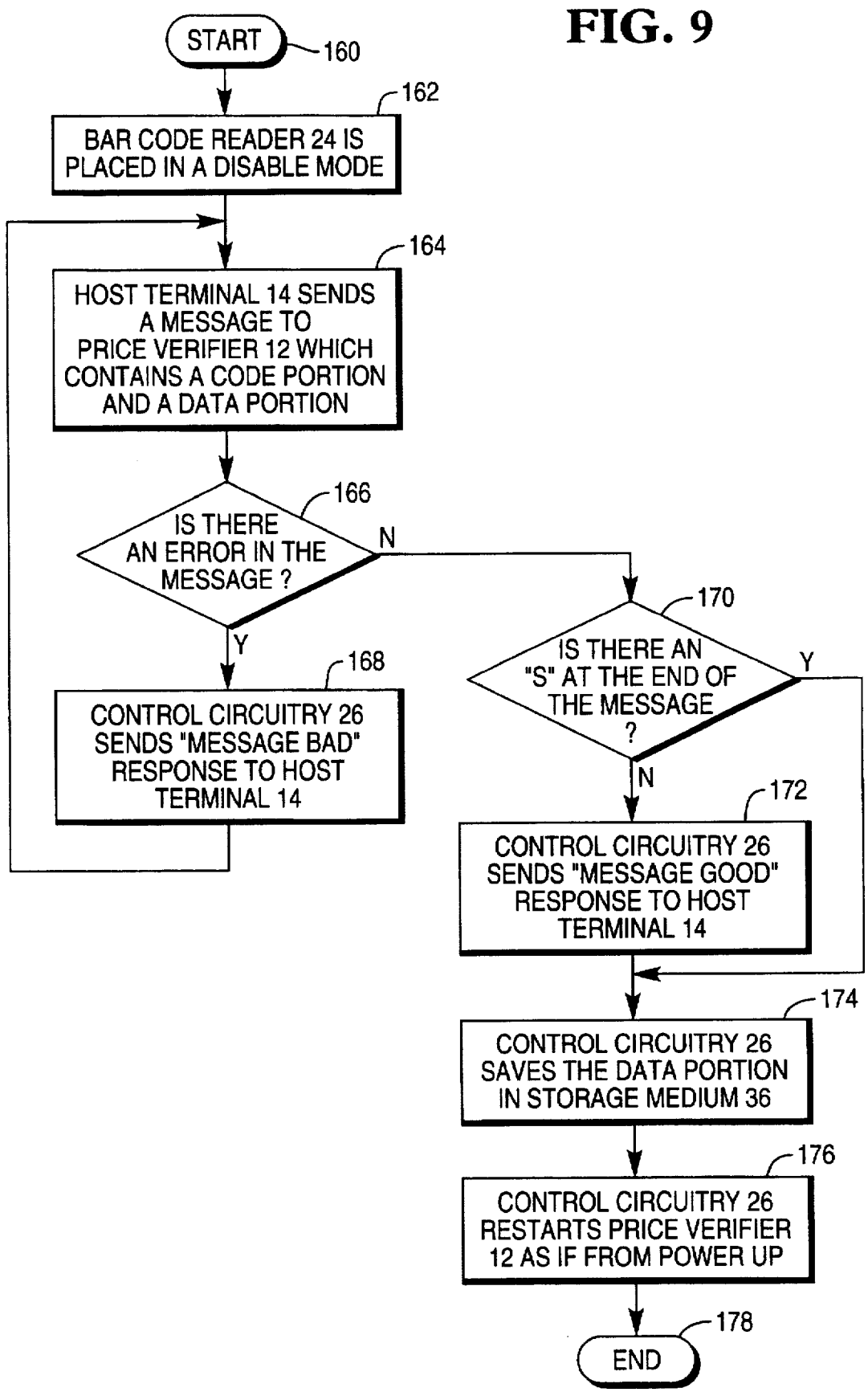
FIG. 9 is a flow diagram illustrating a method for programming the price verifier of the present invention.

Only two special commands distinguish the method of FIG. 9 from methods for programing a bar code reader using programming bar code labels, and in particular, the method disclosed in U.S. Pat. No. 5,256,865. These two commands are represented by ASCII letters: N (4EH), which represents an END command, and the S (53H) command. As indicated in steps 170–174, an S command need not be sent by host terminal 14 as the last character to save programmed parameters. A Save & Reset Command may be sent by host terminal 14 after a program command is completed.

Although the invention has been described with particular reference to certain preferred embodiments thereof, variations and modifications of the present invention can be effected within the spirit and scope of the following claims.

We claim:

1. A price verifier comprising:
   a housing attached to an immovable mounting surface including a first housing portion and a second housing portion detachably mounted to the first housing portion, wherein the second housing portion comprises first and second substantially orthogonal sides, and wherein the second side contains a window;
   a hands-free operated bar code reader within the second housing portion for reading a bar code label on an item whose price is to be verified through the window;
   a display within the second housing portion, on the first side facing a user, for displaying the price of the item;
   control circuitry within the first housing portion and coupled to the bar code reader and the display, which obtains the price of the item from a host terminal after the bar code reader has read the bar code label;
   a storage medium coupled to the control circuitry for storing program commands executed by the control circuitry; and
   communications circuitry within the first housing portion linking the control circuitry to the host terminal.

2. The price verifier as recited in claim 1, wherein the program commands may be received by the control circuitry through the bar code reader prior to being stored by the control circuitry in the storage medium.

3. The price verifier as recited in claim 1, wherein the program commands may be received by the control circuitry from the host terminal prior to being stored by the control circuitry in the storage medium.

4. The price verifier as recited in claim 1, wherein the program commands are received by the control circuitry from the bar code reader and from the host terminal and wherein the program commands received from the bar code reader and the host terminal are similar.

5. The price verifier as recited in claim 1, wherein the storage medium comprises an EEPROM.

6. The price verifier as recited in claim 1, wherein the storage medium comprises an EEFLASH memory.

7. The price verifier as recited in claim 1, wherein the communications circuitry provides support for a plurality of different protocols.

8. The price verifier as recited in claim 7, wherein one of the protocols comprises a wireless protocol.

9. The price verifier as recited in claim 7, wherein one of the protocols comprises a network protocol.

10. The price verifier as recited in claim 7, wherein one of the protocols comprises a serial protocol.

11. The price verifier as recited in claim 1, further comprising:
    a printer coupled to the control circuitry for printing coupons.

12. The price verifier as recited in claim 1, further comprising:
    a card reader coupled to the control circuitry.

13. The price verifier as recited in claim 1, further comprising:
    a sensor which activates the bar code reader when a person comes within a predetermined distance of the price verifier.

14. The price verifier as recited in claim 1, wherein the bar code reader comprises:
    a scan module including
        a laser which produces a laser beam;
        a plurality of stationary pattern mirrors; and
        an optical transceiver rotated by a first motor, for directing the laser beam towards the pattern mirrors to produce a plurality of different scan lines forming a multi-line scan pattern, and for collecting light from the item having the bar code label to be read; and
    a single tilted mirror assembly, having a second motor for rotating a drive shaft and a mirror mounted at an angle to the drive shaft for reflecting the scan lines from the scan module towards the item.

15. The optical scanner as recited in claim 13, wherein the scan lines form a star-shaped pattern having a center which is rotated by the single tilted mirror assembly to form a highly dense multi-line scan pattern.

16. The price verifier as recited in claim 13, wherein the bar code reader comprises:
    a scan module for producing a scan pattern having a center and for collecting light reflected from the bar code label; and
    a tilted mirror assembly, including a tilted mirror and a motor for rotating the tilted mirror, which rotates the center of the scan pattern to form a highly dense multi-line scan pattern.

17. The price verifier as recited in claim 1, wherein the bar code reader comprises:
    a scan module, having a plurality of stationary pattern mirrors and an optical transceiver rotated by a first scanner motor for directing a laser beam towards the pattern mirrors, for producing a plurality of different scan lines which form a star-shaped pattern having an effective center and collecting light from the item having the bar code label to be read; and a single tilted mirror assembly, having a second scanner motor for rotating a drive shaft and a mirror mounted at an angle to the drive shaft for reflecting the scan lines from the scan module and for rotating the effective center of the star-shaped pattern to form a highly-dense multi-line scan pattern for scanning the item having the bar code label which is swiped past the bar code reader.

18. The price verifier as recited in claim 1, wherein the bar code reader produces a multi-line scan pattern having an effective center and moves the multi-line scan pattern by moving the effective center.

19. The price verifier as recited in claim 1, wherein the display also displays item location information.

20. The price verifier as recited in claim 1, wherein the display also displays advertisements.

21. The price verifier as recited in claim 1, wherein the first housing portion is mounted to a substantially vertical surface.

22. The price verifier as recited in claim 1, wherein the first and second housing portions are electrically coupled by a wire cable.

23. A price verifier comprising:

a bar code reader for reading a bar code label on an item whose price is to be verified;

a display for displaying the price of the item;

control circuitry coupled to the bar code reader and the display, and coupled to a host terminal which provides the price of the item;

a storage medium coupled to the control circuitry for storing program commands executed by the control circuitry;

a first housing portion containing the control circuitry, and the communications circuitry; and a second housing portion detachably mounted to the first housing portion and containing the display and the bar code reader, including first and second substantially orthogonal sides, wherein the display is located on the first side facing a user, and wherein the second housing portion further comprises a window in the second side through which the bar code reader reads the bar code label.

24. The price verifier as recited in claim 23, wherein the first housing portion is mounted to a substantially vertical surface.

25. The price verifier as recited in claim 23, wherein the first and second housing portions are electrically coupled by a wire cable.

* * * * *